April 8, 1941. V. L. SCHENK 2,237,846
NUT CLUSTER FORMING AND COATING DEVICE
Filed Feb. 6, 1940 4 Sheets-Sheet 2
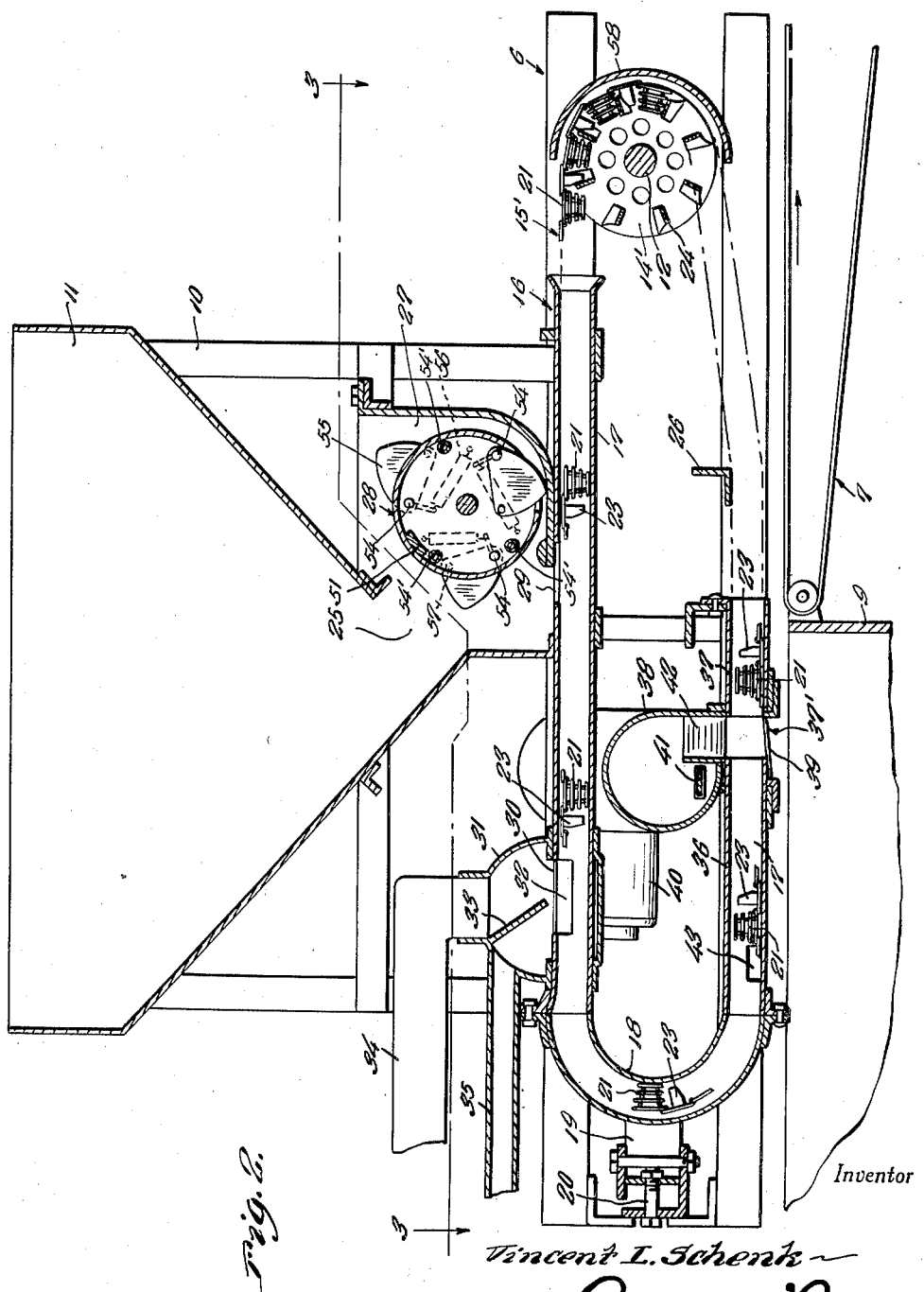
Inventor
Vincent L. Schenk
By Clarence A. O'Brien
and Hyman Berman
Attorneys

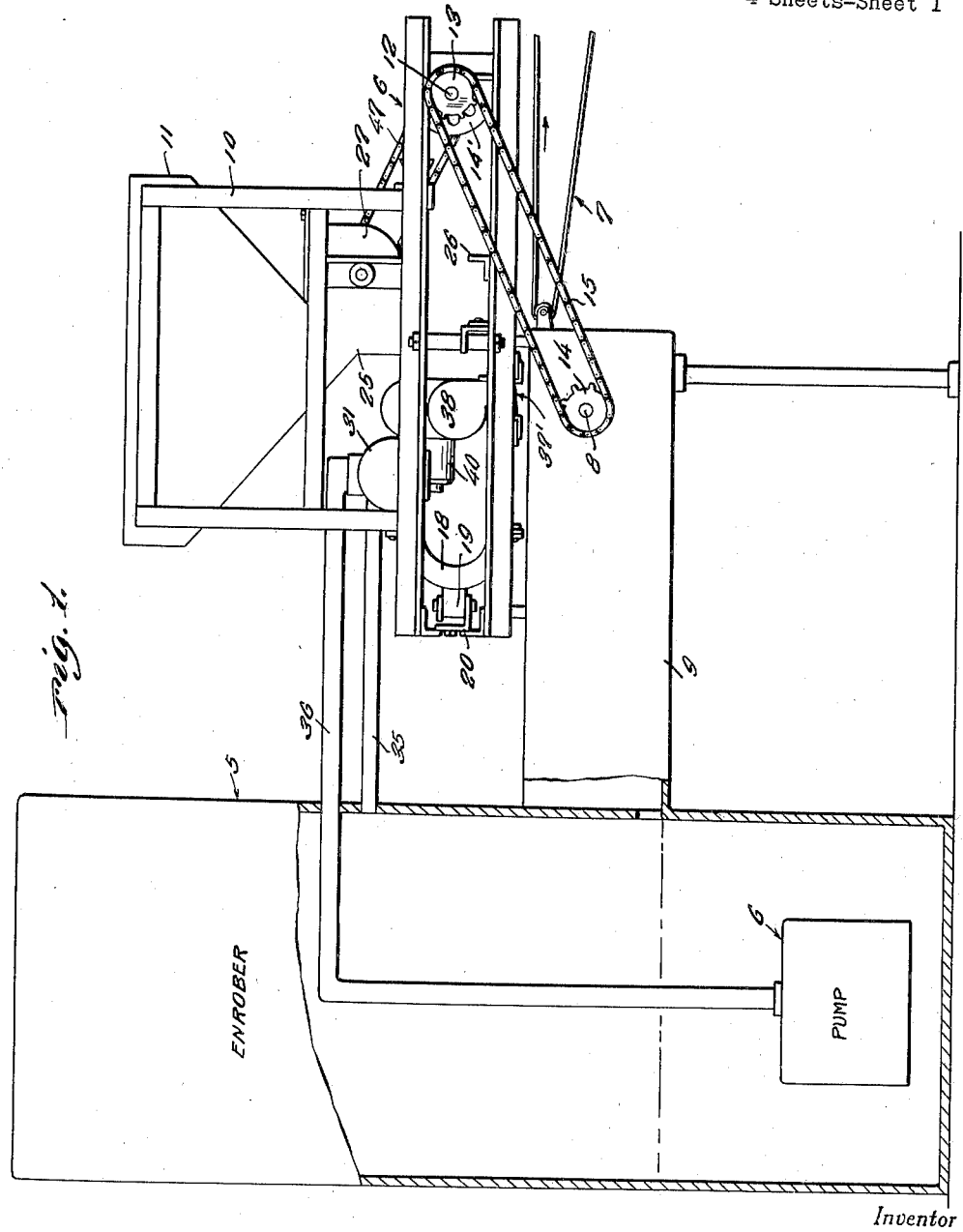

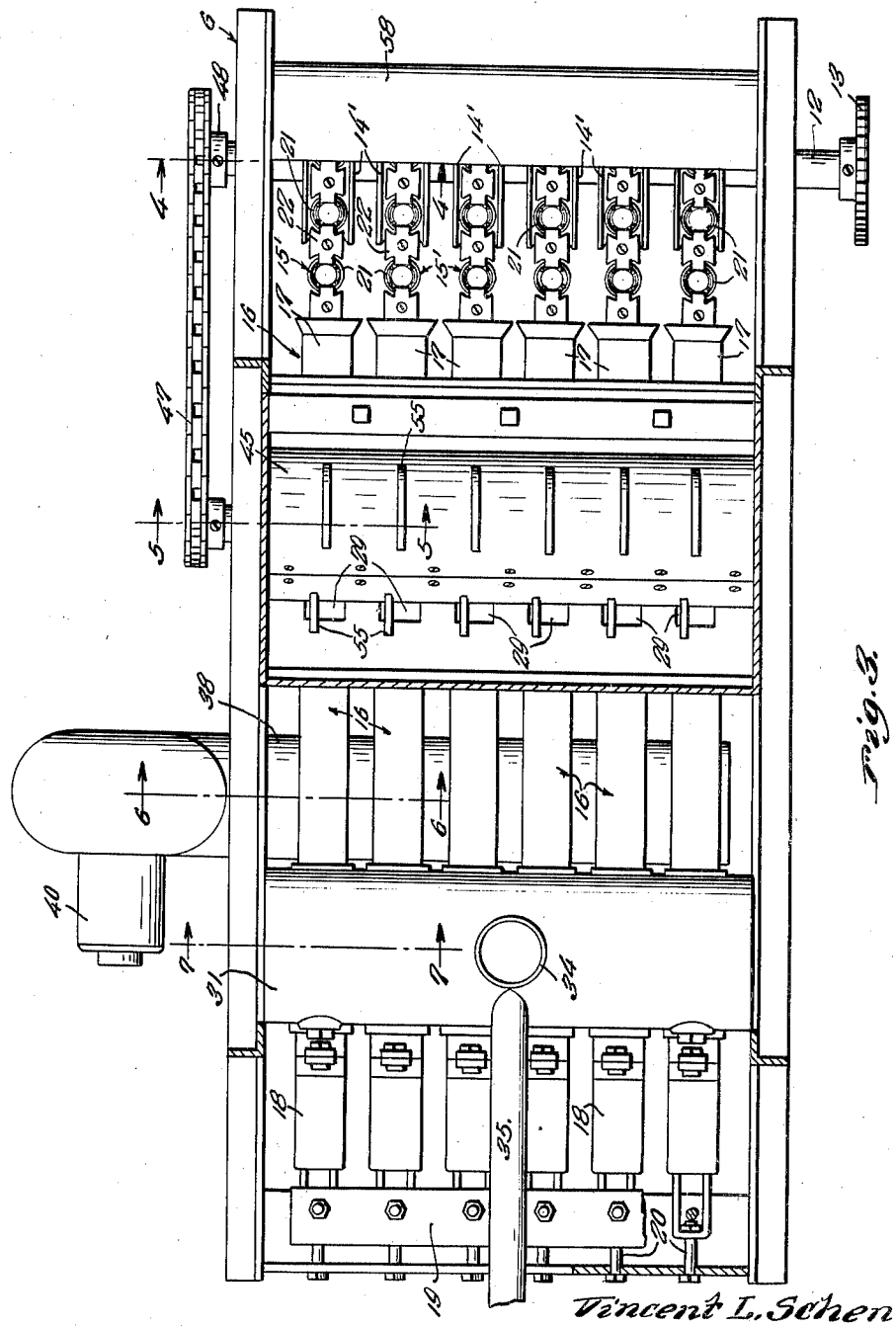

April 8, 1941. V. L. SCHENK 2,237,846
NUT CLUSTER FORMING AND COATING DEVICE
Filed Feb. 6, 1940 4 Sheets-Sheet 4
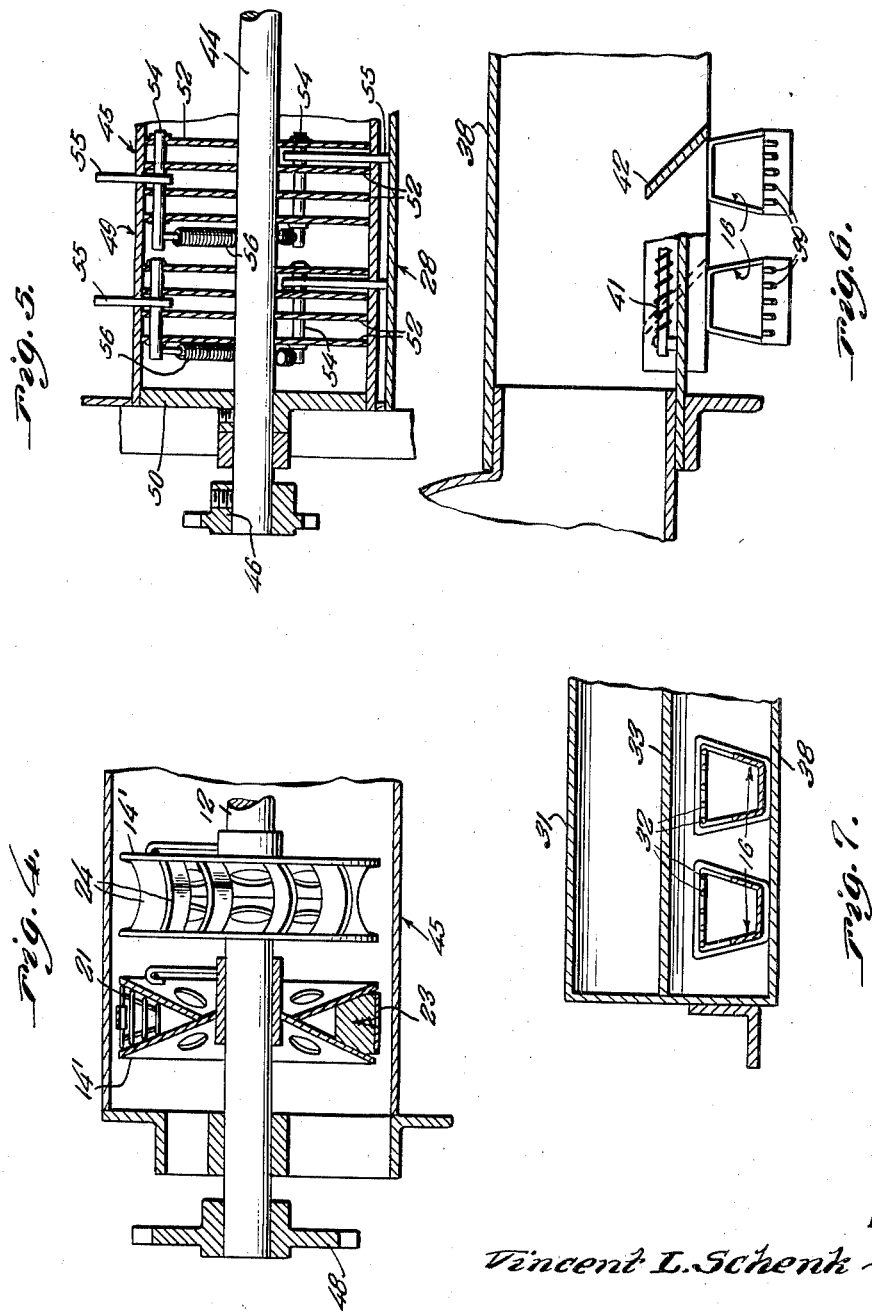
Inventor
Vincent L. Schenk
By Clarence A. O'Brien
and Hyman Berman
Attorneys Patented Apr. 8, 1941

2,237,846

UNITED STATES PATENT OFFICE 2,237,846

NUT CLUSTER FORMING AND COATING DEVICE

Vincent L. Schenk, St. Joseph, Mo.

Application February 6, 1940, Serial No. 317,588

6 Claims. (Cl. 91—3)

This invention relates to a nut cluster forming and coating device especially adapted for operation in conjunction with and by a chocolate coating candy machine known commercially as an "enrober" and the primary object of this invention is the provision of a device of this character which will efficiently and rapidly arrange nuts in clusters or groups and coat them with liquid chocolate received from the "enrober" and remove surplus chocolate and deliver the coated cluster of nuts to a drying mechanism of the "enrober" without being engaged by human hands.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section, illustrating a nut cluster forming and coating device constructed in accordance with my invention and showing the same associated with and operated by an "enrober."

Figure 2 is a fragmentary vertical sectional view illustrating the present invention.

Figure 3 is a sectional view taken on the line 3—3 of Figure 2.

Figure 4 is a fragmentary sectional view taken on the line 4—4 of Figure 3.

Figure 5 is a fragmentary sectional view taken on the line 5—5 of Figure 3.

Figure 6 is a fragmentary sectional view taken on the line 6—6 of Figure 3.

Figure 7 is a fragmentary sectional view taken on the line 7—7 of Figure 3.

Referring in detail to the drawings, the numeral 5 indicates a fragmentary portion of an "enrober" which is a machine especially adapted for coating candy with chocolate, it being understood that the chocolate is heated into liquid form. The "enrober" has a chocolate circulating pump 6 and a conveyor mechanism 7 adapted to carry the coated candy through a drying tunnel after being coated with the chocolate. These parts of the "enrober" are referred to in that they are employed when the present invention is adapted to the "enrober." Further, a power shaft 8 of the "enrober" is employed for driving the present invention.

A main frame 6 constituting a part of the present invention is suitably mounted on the "enrober" or over a trough-like portion 9 thereof. This main frame is horizontally arranged and supports a subframe 10 carrying a hopper 11 adapted to be filled with nuts.

A shaft 12 is journaled at one end of the main frame and has secured thereto a sprocket gear 13 which is connected to a sprocket gear 14 on the shaft 8 by a sprocket chain 15. Secured on the shaft 12 and arranged in spaced relation is a plurality of conveyor pulleys 14' over which endless conveyors 15' travel. The conveyors 15' are further supported by conveyor mountings 16 which include upper and lower tubular portions 17 and end tubular portions 18. The end tubular portions 18 are detachably secured to the upper and lower tubular portions of the mountings. Said mountings are arranged on the main frame 6 to have a limited sliding movement thereon and the end portions 18 thereof are equipped with lugs 19 connected with adjusting brackets 20 carried by the main frame 6 whereby the mountings may be adjusted toward and from the conveyor pulleys for the purpose of placing desired tension on the conveyors, principally to remove slack from the conveyors.

Each conveyor is of endless formation and consists of relatively spaced wire baskets 21 connected by plate-like links 22 having mounted thereon blocks 23 arranged between the baskets and act as checks for liquid chocolate under pressure backing up and reaching the nut hopper and which will hereinafter be more fully described. Also the blocks during their movement through the conveyor mountings act to remove particles of nuts which may fall into the mountings from the baskets. The plate-like links act when traveling through the conveyor mountings to prevent nuts from the discharge throat 25 of the nut hopper 11 from entering the conveyor mountings between the baskets. The baskets 21 engage with the plates 24 of the pulleys 14' when passing over the latter to drive the conveyors.

By referring to Figure 2, it will seen that the upper runs of the endless conveyors when leaving the pulleys 14' enter the upper tubular portions of the conveyor mountings and leave the lower portions of the conveyor mounting a spaced distance from said pulleys. Further, it will be noted that the pulleys are located in a plane slightly above the lower portions of the mountings so that the lower runs of the conveyors will travel upwardly at a slight incline after leaving the lower portions of the mountings. Further, it is to be noted that the baskets when traveling through the upper portions of the conveyor mountings are in an upright position and when traveling through the lower portions of the mountings are in an inverted position so that on leaving the lower portions of the mountings they empty the contents onto the conveyor mechanism 7 of the "enrober." During the time the baskets leave the lower portions of the conveyor mountings they are engaged by an angle iron member 26 which maintains the inverted baskets in proper position for emptying the contents thereof onto the conveyor mechanism 7 and as said baskets pass from the angle iron member 26 they rise from the conveyor mechanism 7 so as to clear the clusters of nuts that have been deposited on the conveyor mechanism by said baskets.

The discharge throat 25 of the hopper 11 includes a chamber 27 in which rotates an agitator 28 and the chamber connects with the upper portions of the conveyor mountings by way of openings 29 provided in the upper portions of the mountings so that as the baskets pass under the openings 29 they become filled with nuts.

The upper portions of the conveyor mountings are further provided with openings 30 which are in communication with a liquid chocolate chamber 31 by having the upper portions of the mountings extending through the chocolate chamber 31 with a slidable fit therewith. The openings 30 are closed by foraminous material 32 which will permit liquid chocolate to enter the upper portions of the conveyor mountings and coat the nuts contained in the baskets as they pass through the parts of the conveyor mountings which extend through the chocolate chamber 31.

Arranged in the chamber 31 is an inclined baffle plate 33, the lower edge of which is spaced from the openings 32. Liquid chocolate is fed into the upper portion of the chocolate chamber 31 by a feed pipe 34 connected to the pump 6 of the "enrober." The liquid chocolate is forced into the chamber 31 under pressure by the pump and is caused to pass downwardly and upwardly about the baffle plate 33 and escape by way of an outlet pipe 35. The outlet pipe 35 returns to the "enrober." The flow of liquid chocolate through the chamber 31 is much more rapid than the movement of the baskets past the openings 32 which will assure complete coating of the nuts in the baskets. The blocks 23 on the conveyors moving therewith in the mountings act to prevent the liquid chocolate which may tend to travel along said mountings to the throats of the nut hopper from reaching the throats.

The lower portions of the conveyor mountings consist of sections 36 and 37 which enter a casing 38 and are spaced to expose the baskets to the interior of the casing during the movement of said baskets through the lower portions of the conveyor mountings. The lower portion of the casing 38 below the space defined by the adjacent ends of the sections 36 and 37 is provided with exhaust openings 37' partly closed by spaced inclined rods 39 which prevent the nuts from falling from the inverted baskets as the latter pass through the casing from one section to the other section of the mountings. The openings 37' are over the trough-like portion 9 of the "enrober." The sections 37 are secured on the main frame and are non-movable while the sections 36 slide with the conveyor mountings during the adjustment of the latter. The casing 38 is connected with a power driven blower 40 of any desired type. Also arranged in the casing 38 is an electric heater 41 so that the air from the blower passing through the casing will be heated. The casing 38 further is provided with a series of spaced baffles 42 for directing the heated air to contact the chocolate coated nuts in the baskets as the baskets pass through the casing to remove surplus chocolate therefrom.

The lower portions of the conveyor mountings where they connect with the end portions 18 are provided with drain openings 43 so as to allow any liquid chocolate within said lower portions of the mountings to drain therefrom into the trough portion 9 of the "enrober." By referring to Figure 2 it will be seen that the end portions 18 are arcuately curved and that the open ends of the baskets have riding contact with the inner curved walls thereof when passing from the upper portions of the conveyor mountings to the lower portions thereof which will prevent the coated nuts from falling from the baskets.

The agitator 28 includes a shaft 44 and a drum 45 secured thereon. A sprocket gear 46 is secured to the shaft 44 and has trained thereover a sprocket chain 47 which in turn is trained over a sprocket gear 48 secured on the shaft 12. The drum 45 includes a cylindrical portion 49 constructed of sheet metal or any other suitable material and end supporting discs 50 which are secured on the shaft 44. Secured to the discs 50 is a longitudinally extending strip 51 to which the end edges of the cylindrical drum are secured. Arranged within the drum 45 are groups of spaced discs or plates 52 having notched peripheries to receive the strip 51 and aligned openings to loosely receive the shaft 44. The groups of plates 52 have tie bolts 54' connecting the plates in groups and also carrying pins 54 which form journals for agitating plates or member 55. The journaled or pivoted ends of the agitating members 55 have connected thereto coiled springs 56 acting to normally swing the agitating members 55 outwardly through slots provided in the drum. Stop pins 57 are provided on the members 55 for limiting their outward movement with respect to the periphery of the drum. The agitating members 55 are arranged in groups and operate between the plates 52 preferably three in number to each group. The groups of agitating members 55 are arranged so as to pass over the openings 29 of the conveyor mountings so that one of the end agitating members of each group is the first to pass over the openings 29 to one side thereof followed by the intermediate agitating members which pass over the openings 29 centrally between the side walls of the openings and followed by the other end agitating members of the groups which pass over the openings 29 adjacent to the other sides thereof. The agitating members operating in the manner specified brings about a complete and thorough agitation of the nuts when traveling through the throat 25 and chamber 27 of the hopper so that the baskets will be filled with nuts as they pass under the openings 29.

Referring to Figure 4 it will be seen that the pulleys 14' are of the V type and provided with openings in the converging walls thereof to permit particles of nuts and chocolate to pass from the pulleys.

It is preferable that a shield plate 58 partly enclose the pulleys and the portions of the conveyors as they pass over said pulleys so as to catch any drippings of chocolate.

If desired, the pulleys may be secured onto the shaft 12 by shear pins which will break if said conveyors are placed under undue strain from any cause. Further, it is to be understood that this invention can be constructed to employ any number of conveyors by simply duplicating the conveyor mountings, conveyors and associated parts therewith.

While the invention has been described as operating in connection with the "enrober," it is to be understood that the invention may be successfully used by providing therefor a liquid chocolate tank and pump for forcing chocolate to the chocolate chamber 31, to permit the chocolate to return to the tank as described in connection with the "enrober."

It is believed that the foregoing description, when taken in connection with the drawings will fully set forth the construction and advantages of this invention to those skilled in the art to which such invention relates, so that further detailed description will not be required.

Having thus described my invention what I claim is:

1. In a device of the class described, a frame, a plurality of endless conveyors including a series of spaced baskets connected pivotally to one another by plate-like elements, mountings adjustable on said frame for said conveyors and each including tubular upper and lower portions and end connecting portions acting as supports for the conveyors at one end thereof, a power driven shaft at one end of said conveyor mountings, pulleys secured on said shaft and having the conveyors trained thereover outwardly of the mountings and acting to bring about emptying of the baskets on leaving the lower tubular portions of the mountings, means for feeding nuts into said baskets during the movement of the latter through the upper tubular portions of the mountings, and means for coating the nuts within the baskets with liquid chocolate during their movement through the upper tubular portions of the mountings, and air pressure means for removing surplus chocolate from the nuts while within the baskets and traveling through the lower tubular portions of the mountings.

2. In a device of the class described, a frame, a plurality of endless conveyors including a series of spaced baskets connected pivotally to one another by plate-like elements, mountings adjustable on said frame for said conveyors and each including tubular upper and lower portions and end connecting portions acting as supports for the conveyors at one end thereof, a power driven shaft at one end of said conveyor mountings, pulleys secured on said shaft and having the conveyors trained thereover outwardly of the mountings and acting to bring about emptying of the baskets on leaving the lower tubular portions of the mountings, means for feeding nuts into said baskets during the movement of the latter through the upper tubular portions of the mountings, means for coating the nuts within the baskets with liquid chocolate during their movement through the upper tubular portions of the mountings, and air pressure means for removing surplus chocolate from the nuts while within the baskets and traveling through the lower tubular portions of the mountings, and blocks secured to said plate-like portions of the conveyors to act as chocolate checks and cleaning elements for the mountings, said pulleys having spaced portions coacting with the baskets in the driving of the conveyors.

3. In a device of the class described, a frame, a plurality of endless conveyors including a series of spaced baskets connected pivotally to one another by plate-like elements, mountings adjustable on said frame for said conveyors and each including tubular upper and lower portions and end connecting portions acting as supports for the conveyors at one end thereof, a power driven shaft at one end of said conveyor mountings, pulleys secured on said shaft and having the conveyors trained thereover outwardly of the mountings and acting to bring about emptying of the baskets on leaving the lower tubular portions of the mountings, means for feeding nuts into said baskets during the movement of the latter through the upper tubular portions of the mountings, means for coating the nuts within the baskets with liquid chocolate during their movement through the upper tubular portions of the mountings, air pressure means for removing surplus chocolate from the nuts while within the baskets and traveling through the lower tubular portions of the mountings, and blocks secured to said plate-like portions of the conveyors to act as chocolate checks and cleaning elements for the mountings, said pulleys having spaced portions coacting with the baskets in the driving of the conveyors, and an agitating means cooperating with the nut feeding means in delivering nuts to the baskets and including a drum having groups of pivotally mounted and spring influenced agitating elements.

4. In a device of the class described, a frame, an endless conveyor including spaced baskets and plate-like portions pivotally connecting the baskets, blocks on said plate-like portions, a mounting for said conveyor and slidably mounted on said frame and including upper and lower tubular portions and an end tubular portion connecting the upper and lower portions and acting as a support for one end of the conveyor, a combined support and drive means carried by the frame for the other end of the conveyor outwardly of the mounting and providing an upwardly inclined portion to one run of the conveyor as it leaves the lower tubular portion of the mounting, means for feeding nuts into said baskets during their movement through the upper tubular portion of the mounting, a chocolate chamber in communication with the upper tubular portion of the mounting, means for forcing liquid chocolate through the chamber to contact the nuts within the baskets, and means for expelling surplus chocolate from the nuts within the baskets during the movement of said baskets through the lower tubular portion of the mounting and prior to emptying of said baskets on leaving the lower tubular portion.

5. In a device of the class described, a frame, an endless conveyor including spaced baskets and plate-like portions pivotally connecting the baskets, blocks on said plate-like portions, a mounting for said conveyor and slidably mounted on said frame and including upper and lower tubular portions and an end tubular portion connecting the upper and lower portions and acting as a support for one end of the conveyor, a combined support and drive means carried by the frame for the other end of the conveyor outwardly of the mounting and providing an upwardly inclined portion to one run of the conveyor as it leaves the lower tubular portion of the mounting, means for feeding nuts into said baskets during their movement through the upper tubular portion of the mounting, a chocolate chamber in communication with the upper tubular portion of the mounting, means for forcing liquid chocolate through the chamber to contact the nuts within the baskets, air pressure means for expelling surplus chocolate from the nuts in the baskets during the movement of said baskets through the lower tubular portion of the mounting and prior to emptying of said baskets on leaving the lower tubular portion, an endless conveyor underlying a portion of the lower run of the first-named conveyor, a heater associated with the air pressure means for warming the air prior to engaging the chocolate coated nuts in the baskets.

6. In a device of the class described, a frame, an endless conveyor including a plurality of baskets and plate-like portions pivotally connecting the baskets, blocks on the plate-like portions, a mounting of substantially U shape and of tubular formation providing upper and lower runs and an end run for receiving said conveyor and acting as a support for one end thereof, means for mounting the mounting on the frame for adjustment endwise, means for supporting the other end of the conveyor and imparting movement thereto, a hopper carried by the main frame and including a discharge throat and chamber, an agitator operating in the chamber, said upper portion of the mounting having an opening in communication with the discharge throat and chamber of the hopper to permit nuts to enter the baskets, a chocolate chamber in communication with the mounting through which the baskets pass, means for forcing liquid chocolate through said chocolate chamber under pressure, a baffle in said chamber, a heating chamber in communication with the lower portion of the mounting through which the baskets travel in an inverted position, a heating means in said chamber, a baffle in said heater chamber, a power driven blower connected with said heating chamber.

VINCENT L. SCHENK.